(12) United States Patent
Nykiel et al.

(10) Patent No.: US 6,880,878 B2
(45) Date of Patent: Apr. 19, 2005

(54) STACKED CARGO COVER STORAGE SYSTEM AND METHOD OF STORING THEREOF

(75) Inventors: Henry J. Nykiel, Howell, MI (US); Timothy J. Herrick, Rochester, MI (US); John Acker, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 33 days.

(21) Appl. No.: 10/649,841

(22) Filed: Aug. 26, 2003

(65) Prior Publication Data

US 2005/0046225 A1   Mar. 3, 2005

(51) Int. Cl.[7] ................................................. B60P 7/02
(52) U.S. Cl. .............................................. 296/100.02
(58) Field of Search ....................... 296/100.02, 100.06

(56) References Cited

U.S. PATENT DOCUMENTS

| | | | |
|---|---|---|---|
| 4,653,970 A | 3/1987 | Ballantyne | 411/55 |
| 4,776,625 A | 10/1988 | Lobanoff et al. | 296/37.16 |
| 6,186,575 B1 | 2/2001 | Fisher et al. | 296/100.03 |
| 6,234,560 B1 | 5/2001 | Hunt | 296/100.11 |
| 6,422,635 B1 | 7/2002 | Steffens et al. | 296/100.09 |
| 6,435,594 B1 | 8/2002 | Ekonen et al. | 296/100.09 |
| 6,454,337 B1 | 9/2002 | Steffens et al. | 296/43 |
| 6,520,559 B1 | 2/2003 | Steffens et al. | 296/100.09 |
| 6,527,330 B1 | 3/2003 | Steffens et al. | 296/100.07 |
| 6,533,344 B1 | 3/2003 | Patterson | 296/100.06 |
| 2002/0021019 A1 * | 2/2002 | Bohm et al. | 296/100.02 |

* cited by examiner

*Primary Examiner*—Joseph D. Pape
(74) *Attorney, Agent, or Firm*—Laura C. Hargitt

(57) ABSTRACT

A cargo storage system for a vehicle having a cargo bay includes cover members adapted to cooperate with each other to at least partially cover and at least partially uncover the cargo bay. The system further includes two bracket assemblies configured to be connectable and disconnectable from the vehicle. The bracket assemblies are adapted to support at least one of the cover members above the other cover members when the bracket assemblies are connected to the vehicle such that the cover members are secured to the vehicle in a relatively stacked manner above the cargo bay and the cargo bay is at least partially uncovered. A method of storing a cargo cover is also provided.

20 Claims, 6 Drawing Sheets

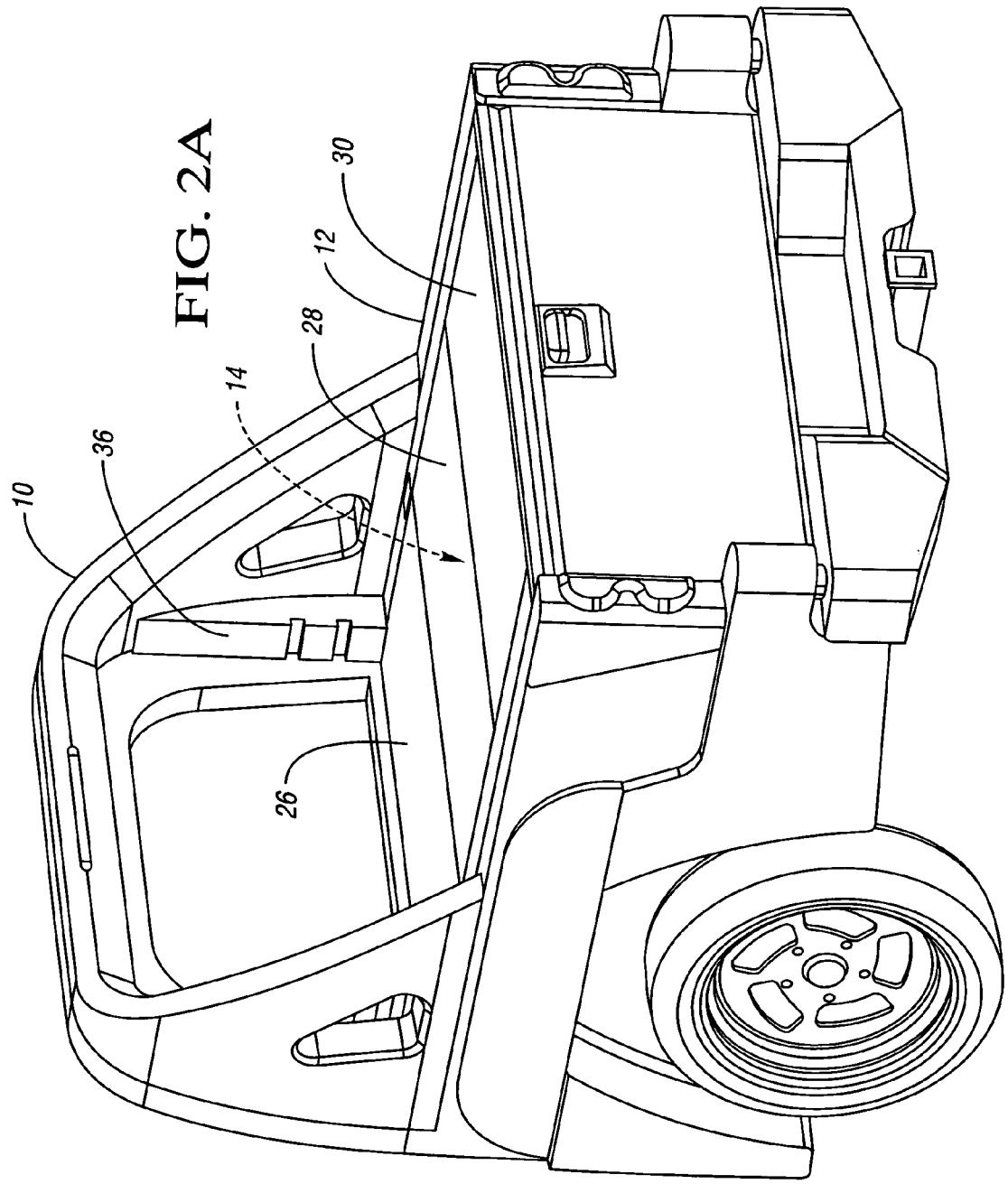

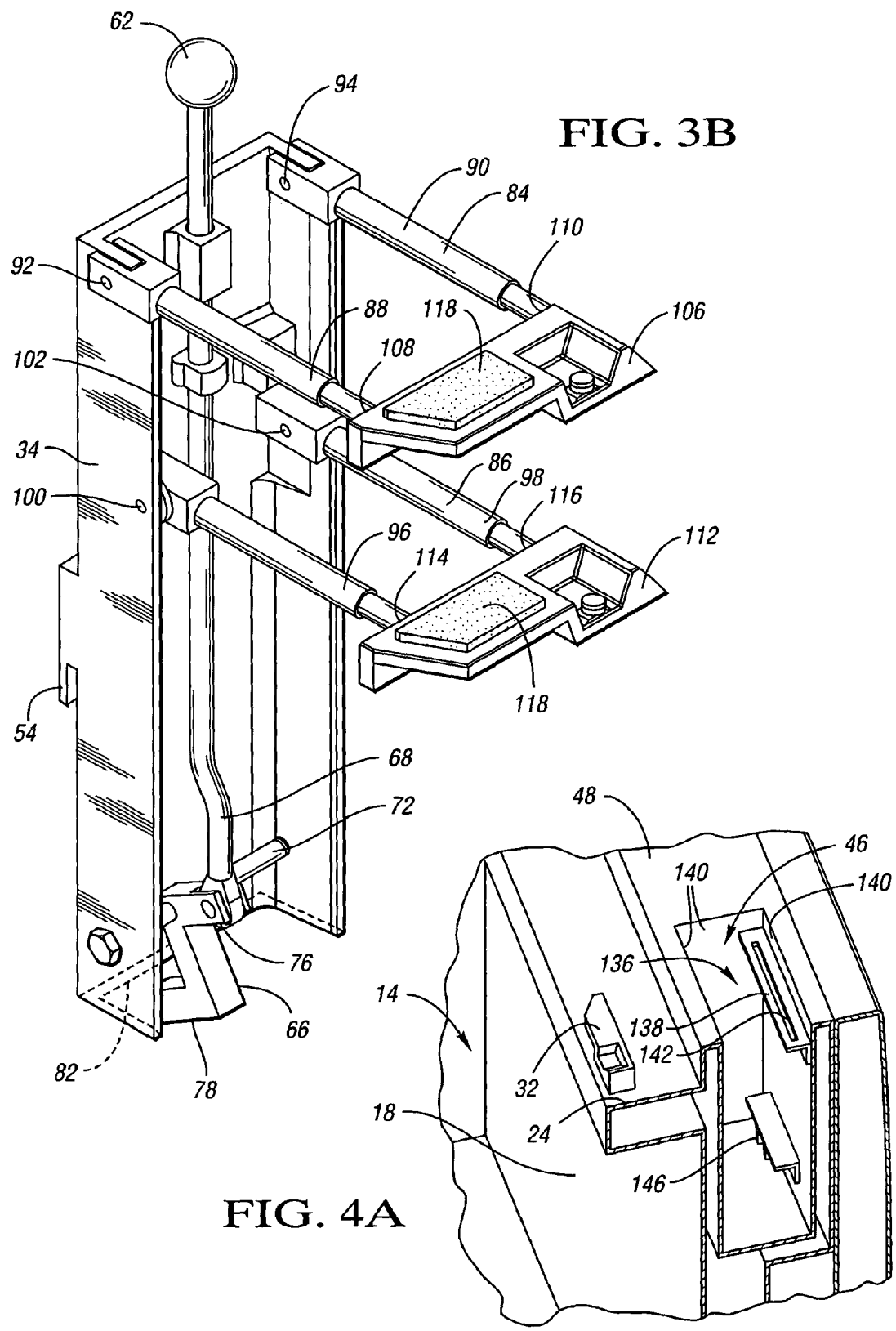

STACKED CARGO COVER STORAGE SYSTEM AND METHOD OF STORING THEREOF

TECHNICAL FIELD

This invention relates to vehicle cargo bay covers.

BACKGROUND OF THE INVENTION

Pick-ups and utility vehicles are often provided with a bed or cargo bay for transporting cargo. In order to protect the bay and the cargo, such vehicles are sometimes provided with covers for covering the bay. Cargo covers may be connectable and disconnectable from the vehicle and are typically disconnected when cargo that extends above the level of the connected cover is transported. Vehicle operators often choose to disconnect cargo covers from the vehicle even when the cargo does not extend above the cover or when there is no cargo in the bay. Disconnected cargo covers are often left at the point of departure of the operator. Alternatively, a flexible bag is sometimes provided for storing the covers in the cargo bay when they are not in a connected position.

SUMMARY OF THE INVENTION

A cargo cover storage system for a vehicle having a cargo bay includes cover members adapted to cooperate with each other to at least partially cover the cargo bay. The system further includes two bracket assemblies configured to be connectable and disconnectable from the vehicle. The bracket assemblies are adapted to receive a removed one of the cover members and support the removed one of the cover members above the attached cover member(s) when the bracket assemblies are connected to the vehicle such that the cover members are secured to the vehicle in a relatively stacked manner and the cargo bay is at least partially uncovered. Alternatively, the bracket assemblies may be adapted to receive two removed cover members in a like, stacked manner. Preferably, the cover members are not touching when they are so secured to the vehicle.

The cargo cover system may further include two cover support portions mounted to the vehicle and configured to cooperate with the bracket assemblies in supporting the cover member. The cargo cover system may further include two bracket receptacle assemblies connected to the vehicle, each bracket receptacle assembly being adapted for supporting one of the bracket assemblies. Each of the bracket receptacle assemblies may include a slot, and each of the bracket assemblies may include a tab adapted to mate with the slot to support the bracket assembly in the bracket receptacle assembly. Each of the bracket assemblies may also include a latch pin and each of the bracket receptacle assemblies may include a tab adapted to receive the latch pin to support the bracket assembly in the bracket receptacle assembly.

A method is also provided for storing a cargo cover on a vehicle having a cargo bay. The cargo cover includes two cover members, a first cover member and a second cover member. The method includes disconnecting the second cover member from the vehicle such that the cargo bay is at least partially uncovered. The second cover member is then connected to the vehicle above the first cover member which is still in position covering the cargo bay, via two bracket assemblies and two cover support portions such that the cover members are relatively stacked above the partially uncovered cargo bay.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 2A is a schematic illustration in fragmentary perspective view of the vehicle of FIG. 1 with the cover members secured to the vehicle to cover the cargo bay;

FIG. 3B is a perspective schematic illustration of the bracket assembly of FIG. 3A, with the bracket assembly in an extended position;

FIG. 4A is a schematic illustration in fragmentary perspective view of a bracket receptacle assembly used in the cargo cover storage system of FIG. 1;

DESCRIPTION OF THE PREFERRED EMBODIMENT

Figure 1:
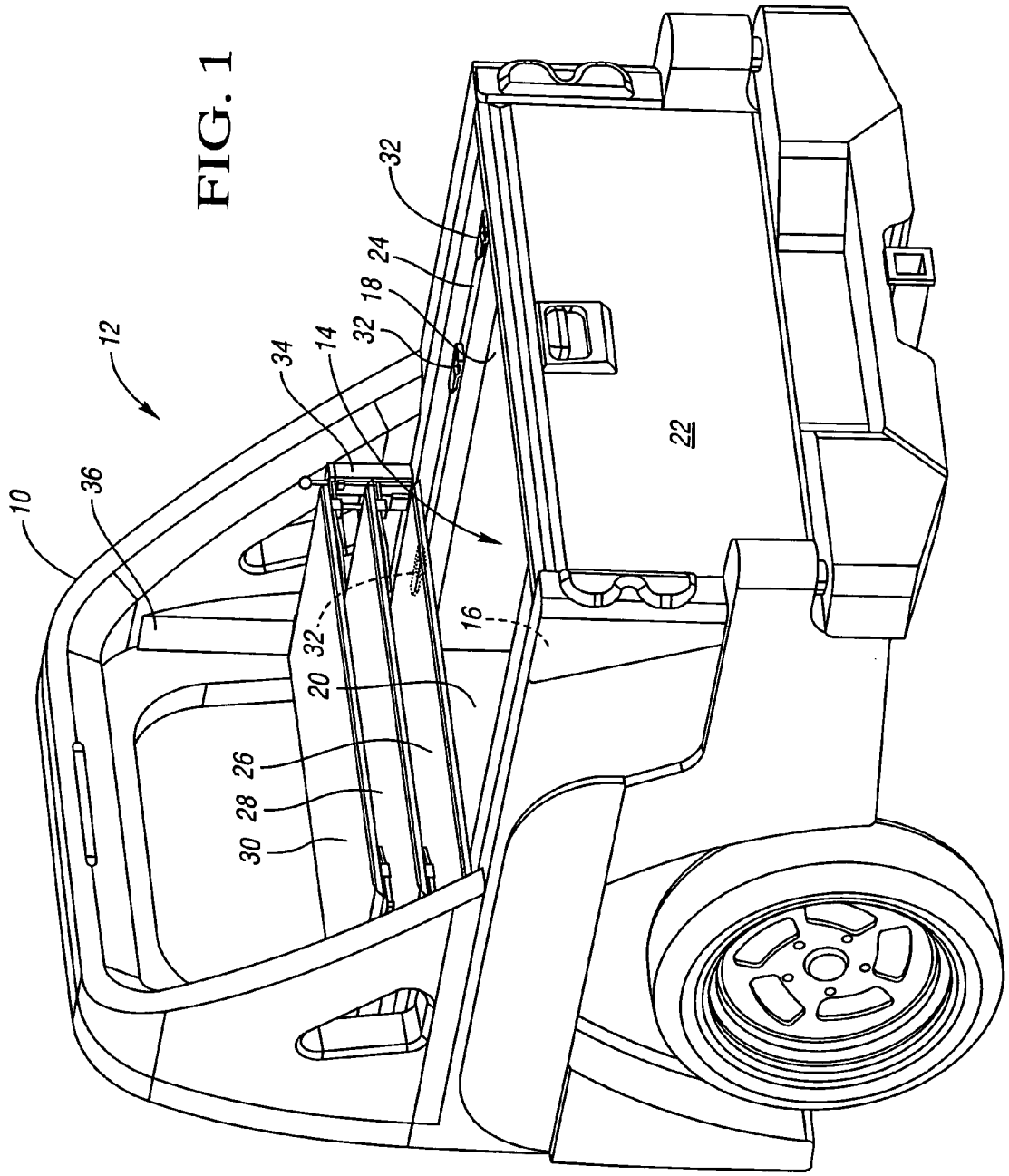
FIG. 1 is a schematic illustration in fragmentary perspective view of a vehicle having a cargo cover storage system with cover members secured to the vehicle to partially uncover the cargo bay.

Reference will now be made to the drawings, in which like reference numbers are used to refer to like components throughout. In FIG. 1, a vehicle 10 having a cargo cover storage system 12 is depicted. The vehicle 10 includes a cargo bay 14. The cargo bay 14 is substantially defined by a left sidewall 16, a right sidewall 18, a front wall 20 and an endgate 22. A first cover member 26, a second cover member 28 and a third cover member 30 are stacked relative to one another and secured to the vehicle 10 above the cargo bay 14. Latch plates 32 are disposed on a ledge 24 disposed above the right sidewall 18. Three latch plates are shown; additional latch plates may also be used on ledge 24. Additional latch plates (not shown) are likewise disposed above the left sidewall 16 in a mirrored arrangement with respect to those on the ledge 24. A right bracket assembly 34 and a right cover support portion 36 secure the second and third cover members 28, 30 to the vehicle 10 in a relatively stacked manner above the first cover member 26. A left bracket assembly (not shown) and a left cover support portion (not shown) which are symmetrical, mirror images of the right bracket assembly 34 and the right cover support portion 36, respectively, also secure the second and third cover members 28, 30 to the vehicle 10. (Because the structure for securing the cover members to the vehicle is symmetric on both sides of the vehicle, a description of only one side is necessary for an understanding of the invention.) Alternatively, for vehicles that do not have cover support portions such as those illustrated in FIG. 1, structure having cover support portions may be secured to the vehicle at stake openings disposed in the sidewalls, such stake openings being common on existing vehicles having cargo bays.

Referring to FIG. 2A, the first, second and third cover members 26, 28 and 30, respectively, are secured to the vehicle 10 in an alternative manner in which the cargo bay 14 is covered.

Figure 2B:
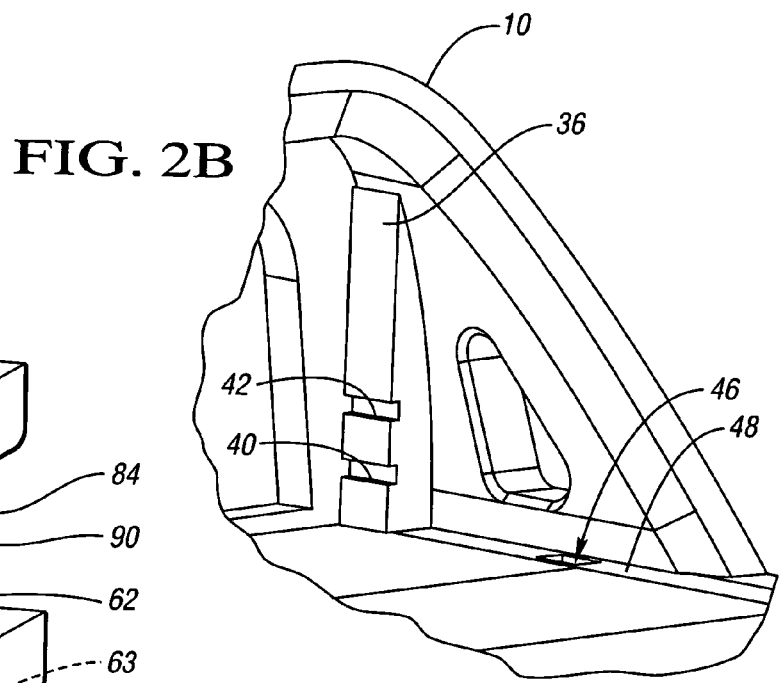
FIG. 2B is a schematic illustration in fragmentary perspective view of a portion of the vehicle of FIG. 1.

Referring to FIG. 2B, the right cover support portion 36 is formed with an integral right lower retention slot 40 and an integral right upper retention slot 42. A right bracket receptacle opening 46 is formed in a right side storage unit 48 disposed outward of the right sidewall 18 (shown in FIG. 1) on the vehicle 10. A symmetrical left bracket receptacle opening (not shown) is likewise disposed adjacent to the left sidewall 16, and may be formed in an optional, symmetrical left side storage unit disposed outward of the left sidewall 16. When the right bracket assembly 34 and the symmetrical left bracket assembly (not shown) are disconnected from the vehicle, as depicted in FIG. 1, the bracket assemblies may be stored in one or both of the storage units.

Figure 3A:
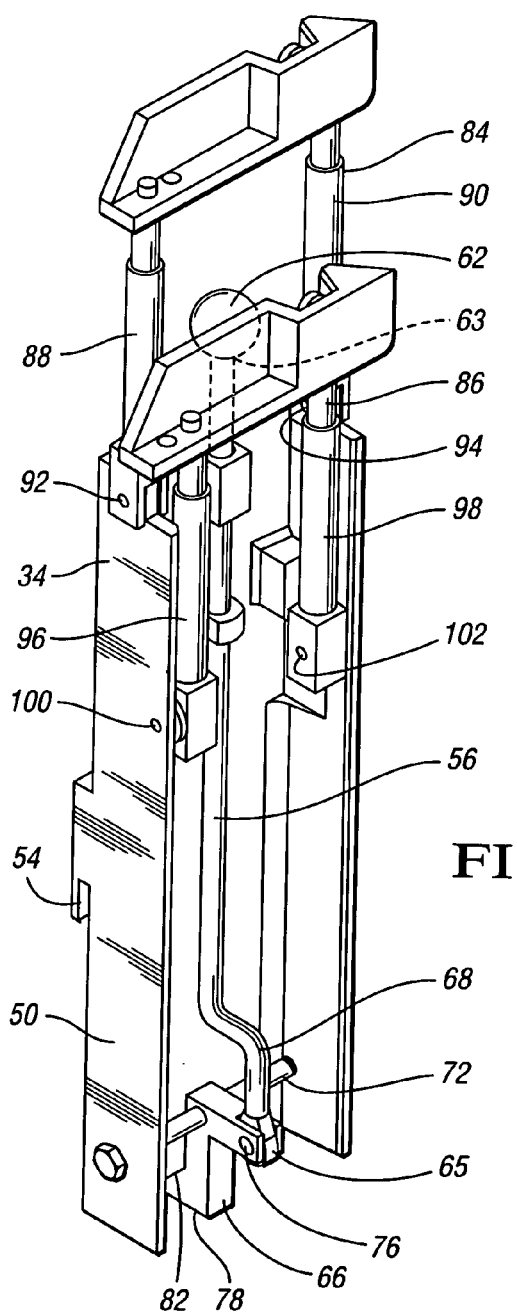
FIG. 3A is a schematic illustration in fragmentary perspective view of a bracket assembly used in the cargo cover storage system of FIG. 1, with the bracket assembly in a collapsed position.

Referring to FIG. 3A, the right bracket assembly 34 includes a post portion 50. The post portion 50 is formed with a bracket tab 54. A rod 56 having a knob 62 at a first end 63 and a latch pin 66 hingeably connected at an opposed second end 65 is secured to the post portion 50 such that the rod 56 is translatable along the length of the post portion 50. The rod 56 includes a cammed portion 68. A through pin 72 further secures the latch pin 66 to the post portion 50. The latch pin 66 includes a hinged end 76 pivotably secured to the end of the rod 56. The latch pin 66 is substantially Z-shaped and further includes a latch end 78 opposed to the hinged end 76. An upward force on the knob 62 causes the hinged end 76 of the latch pin 66 to rotate upwards about the through pin 72 thus moving the latch end 78 away from the post portion 50, as depicted in FIG. 3B. An opposite downward force on the knob 62 causes the latch end 78 to return to a position abutting a bottom edge 82 of the post portion 50, as depicted in FIG. 3A.

Referring to FIG. 3A, the bracket assembly 34 includes an upper platform portion 84 and a lower platform portion 86. Each of the upper and lower platform portions 84, 86, respectively are pivotably secured to the post portion 50. The upper platform portion 84 includes an upper platform left arm 88 and an upper platform right arm 90. The upper platform left and right arms 88, 90 pivot about upper platform left and right pivot joints 92, 94, respectively, for pivoting the upper platform 84 with respect to the post portion 50. Similarly, the lower platform portion 86 includes a lower platform left arm 96 and a lower platform right arm 98. The lower platform left and right arms 96, 98 pivot about lower left and right pivot joints 100, 102, respectively, for pivoting the lower platform portion 86 with respect to the post portion 50. When the upper and lower platform portions 84, 86 are pivoted upward with respect to the post portion 50, the bracket assembly 34 is in a longitudinally compact, collapsed position, as shown in FIG. 3A. When the upper and lower platform portions 84, 86 are pivoted downward with respect to the post portion 50, the bracket assembly 34 is in an extended position in which the platform portions 84, 86 are parallel to each other, as shown in FIG. 3B. The upper and lower platform portions 84, 86, respectively, are pivotable independently of one another. Thus, the lower platform 86 portion may be pivoted to an extended position as shown in FIG. 3B, while the upper platform portion 84 remains in the collapsed position shown in FIG. 3A.

Referring to FIG. 3B, the upper platform portion 84 includes an upper platform latch-receiving portion 106 mounted to the upper platform left arm 88 and the upper platform right arm 90 at upper platform left and right distal arm ends 108, 110 respectively. Similarly, the lower platform portion 86 includes a lower platform latch-receiving portion 112 mounted to the lower platform left arm 96 and the lower platform right arm 98 at lower platform left and right distal arm ends 114, 116 respectively. A mount pad 118 is mounted to each of the upper and lower platform latch-receiving portions 106, 112. Preferably, the mount pad is formed from a deformable rubber or foam structure.

Referring to FIG. 4A, the right side storage unit 48 is disposed outward of the right sidewall 18 and is configured to form the integral right bracket receptacle opening 46. The receptacle opening 46 is four-sided (as may also be better viewed in FIG. 2B), defined by inner walls 140, three of which are shown in FIG. 4A. A right bracket receptacle assembly 136 is disposed in the right bracket receptacle opening 46. The right bracket receptacle assembly 136 includes an upper receptacle member 138 mounted to an inner wall 140 of the right side storage unit 48. The upper receptacle member 138 is formed with an integral receptacle slot 142. The right bracket receptacle assembly 136 further includes a lower receptacle tab member 146 mounted to the inner wall 140. The right side storage unit 48 includes the ledge 24. A latch plate 32 is mounted to the ledge 24. On vehicles that do not have side storage units, such as some pickup trucks, structure forming like bracket receptacle assemblies may be mounted directly to the pickup sidewalls (i.e., the bed sides).

Figure 4B:
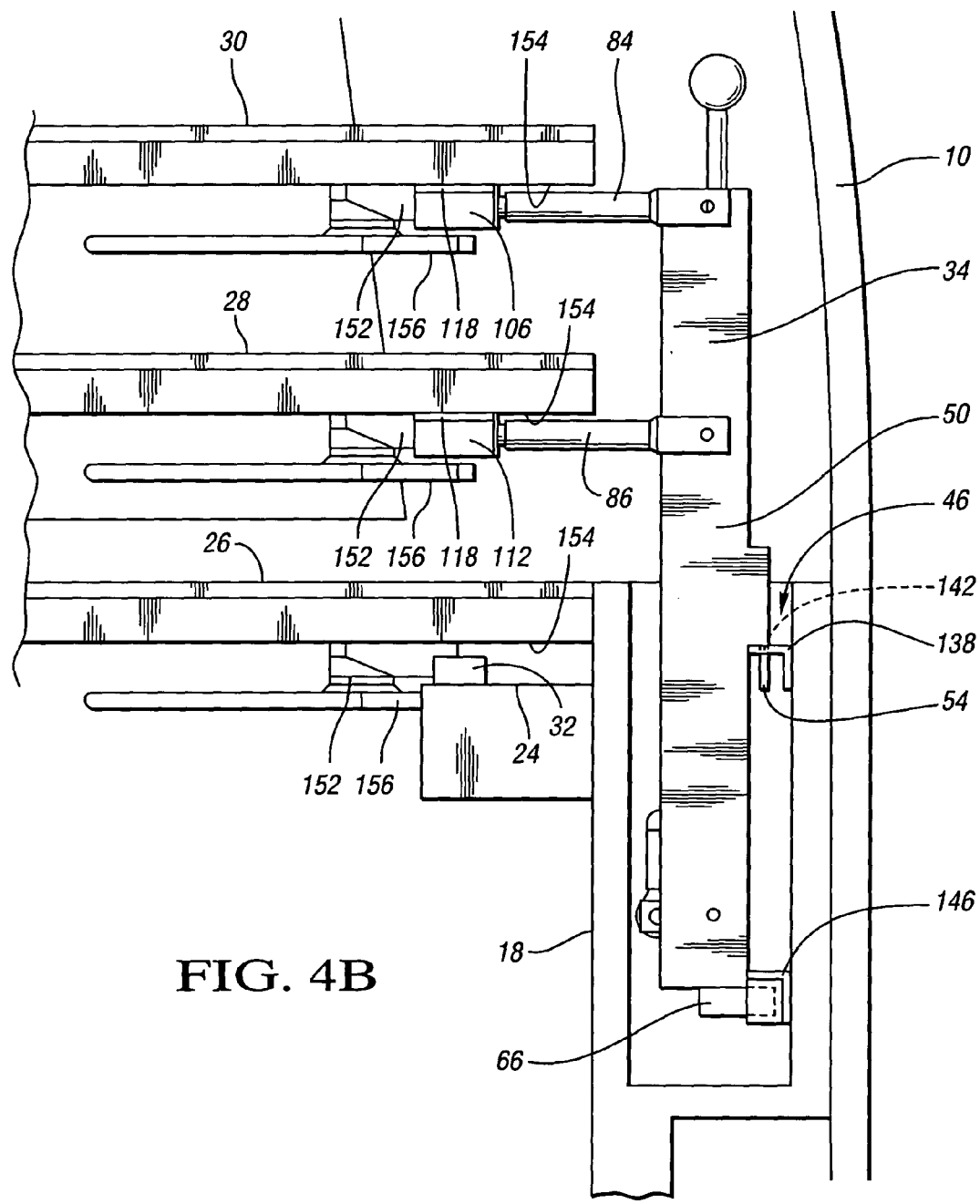
FIG. 4B is a schematic illustration in fragmentary rear view of the cargo cover storage system of FIG. 1.

Referring to FIG. 4B, the post portion 50 of the right bracket assembly 34 is disposed in the right bracket receptacle opening 46. The bracket tab 54 is disposed through the slot 142 of the upper receptacle member 138. Additionally, the latch pin 66 is mated with the lower receptacle tab member 146. Accordingly, the right bracket assembly 34 is secured to the vehicle 10 by the upper receptacle member 138 and the lower receptacle tab member 146.

The upper platform portion 84 and the lower platform portion 86 are extended for supporting the third cover member 30, and the second cover member 28, respectively, the third cover member 30 being stacked above the second cover member 28 which, in turn, is stacked above the first cover member 26. Cover member latches 152 are disposed on the undersides 154 of each of the cover members 26, 28, 30. Each latch 152 includes a pivotable latch handle 156 operable to secure the latch 152 on the third cover member 30 to the upper platform latch-receiving portion 106, the latch 152 on the second cover member 28 to the lower platform latch-receiving portion 112 and the latch 152 on the first cover member 26 to the latch plate 32 on the ledge 24. Preferably, the first cover member 26 has two latches 152 (one shown in FIG. 4B) able to latch to two latch plates 32 (one shown in FIG. 4B) disposed on ledge 24. The mount pads 118 act as a preload feature, deforming slightly when pressurized between the latched upper platform latch-receiving portion 106 and the third cover member 30 and between the latched lower platform latch-receiving portion 112 and the second cover member 28. The deformability of the mount pads 118 provides a closely conforming, pressurized contact surface between the latch receiving portions 106, 112 and the third and second cover members 30, 28, respectively, thus ensuring a secure attachment. A similar preload feature in the form of a seal may be disposed on ledge 24 to ensure a secure attachment of first cover member 26 to the vehicle. Those skilled in the art will recognize a variety of ways to latch the cover members to the bracket assemblies.

Figure 5:
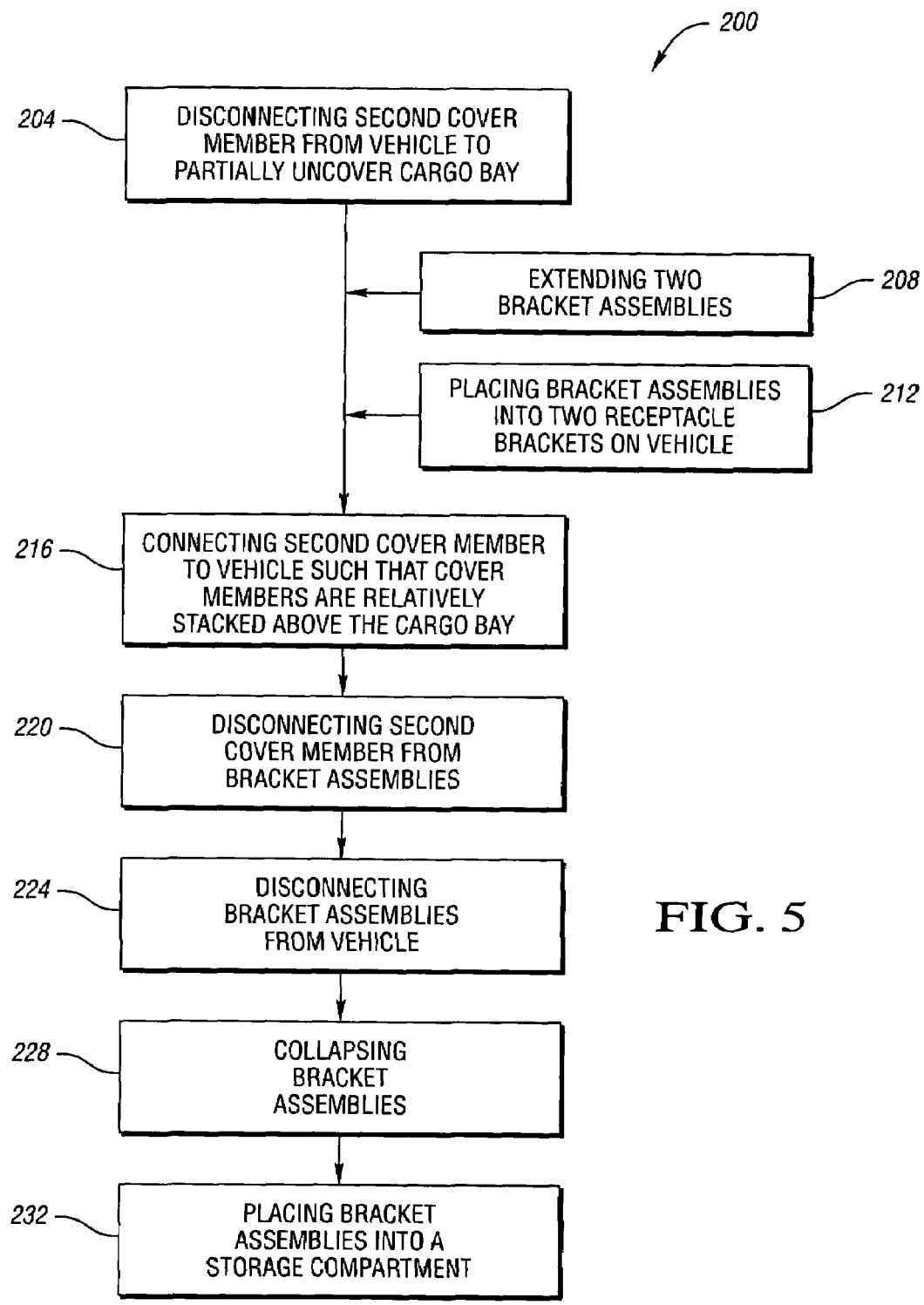
FIG. 5 is a flow diagram illustrating a method of storing a cargo cover for a vehicle having a cargo bay.

Referring to FIG. 5, a method of storing a cargo cover 200 for a vehicle having a cargo bay is provided. The cargo cover is comprised of two cover members including a first cover member and a second cover member. The method 200 includes disconnecting the second cover member 204 from the vehicle such that the cargo bay is at least partially uncovered. The method 200 may further include extending the two bracket assemblies 208 from a collapsed state to an extended state. The method 200 may further include placing the bracket assemblies into two bracket receptacle assemblies 212 such that the bracket assemblies are operatively secured to the bracket receptacle assemblies. The method 200 further includes connecting the second cover member to the vehicle 216 above the first cover member via the bracket assemblies and two cover support portions such that the cover members are relatively stacked above the partially uncovered cargo bay.

The method 200 may include disconnecting the second cover member from the bracket assemblies 220. The method 200 may further include disconnecting the bracket assemblies 224 from the vehicle. Collapsing the bracket assemblies 228 from an extended position to a collapsed position may be included in the method 200. Placing the bracket assemblies in a storage compartment included on the vehicle 232 may also be included in the method 200. The method 200 need not be performed in the order depicted in FIG. 5.

While the best mode for carrying out the invention has been described in detail, those familiar with the art to which this invention relates will recognize various alternative designs and embodiments for practicing the invention within the scope of the appended claims.

What is claimed is:

1. A cargo cover storage system for a vehicle having a cargo bay, the cargo cover storage system comprising:
   cover members adapted to cooperate with each other to at least partially cover and at least partially uncover the cargo bay;
   two bracket assemblies configured to be connectable and disconnectable from the vehicle;
   two cover support portions mounted to the vehicle; and
   wherein said bracket assemblies and said cover support portions are cooperatively configured to support one of said cover members above another of said cover members when said bracket assemblies are connected to the vehicle such that said cover members are secured to the vehicle in a relatively stacked manner above the cargo bay and the cargo bay is at least partially uncovered.

2. The cargo cover storage system of claim 1, wherein said bracket assemblies axe collapsible.

3. The cargo cover storage system of claim 1, further comprising two bracket receptacle assemblies connected to the vehicle, wherein each of said bracket receptacle assemblies is adapted for supporting one of said bracket assemblies.

4. The cargo cover storage system of claim 3, wherein each of said bracket receptacle assemblies includes a slot, and wherein each of said bracket assemblies includes a tab adapted to mate with said slot to at least partially support said one bracket assembly in said bracket receptacle assembly.

5. The cargo cover storage system of claim 4, wherein each of said bracket assemblies includes a latch pin, and wherein each of said bracket receptacle assemblies includes a tab adapted to receive said latch pin to further support said one bracket assembly in said bracket receptacle assembly.

6. The cargo cover storage system of claim 1, wherein said one of said cover members includes two latches adapted to latch said one of said cover members to said bracket assemblies.

7. The cargo cover storage system of claim 6, wherein each of said bracket assemblies includes a preload feature adapted to enhance the latching of said one of said cover members to said bracket assemblies.

8. The cargo cover storage system of claim 1, wherein each of said bracket assemblies includes a post portion and a first platform portion connected to said post portion, wherein said post portion is adapted to secure said bracket assembly to the vehicle, and wherein said first platform portion is adapted to support said one of said cover members.

9. The cargo cover storage system of claim 8, wherein said one of said cover members includes a latch adapted to latch said one of said cover members to said first platform portion.

10. The cargo cover storage system of claim 9, wherein said first platform portion includes a preload feature adapted to enhance the latching of said one of said cover members to said first platform portion.

11. The cargo cover storage system of claim 10, further comprising:
    a second platform portion connected to said post portion, wherein said first and second platforms are pivotable about said post portion;
    wherein said second platform portion pivots downward independently of said first platform portion for supporting another of said cover members.

12. The cargo cover storage system of claim 1, wherein said cover members are secured to the vehicle without touching.

13. A cargo cover storage system comprising:
    cover members adapted to cooperate with each other to at least partially cover and at least partially uncover a cargo bay of a vehicle;
    two bracket assemblies configured to be connectable and disconnectable from the vehicle, wherein each of said bracket assemblies includes a post portion and a platform portion, wherein said post portion includes a bracket tab and a latch pin;
    two bracket receptacle assemblies connectable to the vehicle, wherein each bracket receptacle assembly includes a slot configured to receive said bracket tab and a receptacle tab adapted to permit said latch pin to latch said post portion to said bracket receptacle assembly;
    wherein said platform portion is adapted to support one of said cover members when the bracket assemblies are connected to the vehicle; and
    two cover support portions connected to the vehicle, wherein each cover support portion is configured to cooperate with said platform portion in supporting said one of said cover members above the other of said cover members such that said cover members are secured to the vehicle in a relatively stacked manner above the cargo bay without touching each other and the cargo bay is at least partially uncovered.

14. A method of storing a cargo cover for a vehicle having a cargo bay, wherein said cargo cover is comprised of two cover members, including a first cover member and a second cover member, the method comprising:
    disconnecting said second cover member from the vehicle such that the cargo bay is at least partially uncovered; and
    connecting said second cover member to the vehicle above the first cover member via two bracket assemblies and two cover support portions such that said cover members are relatively stacked above the partially uncovered cargo bay.

15. The method of claim 14, further comprising:
extending said bracket assemblies from a collapsed state to an extended state.

16. The method of claim 14, further comprising:
extending said bracket assemblies from a collapsed state to an extended state.

17. The method of claim 14, further comprising:
disconnecting said second cover member from said bracket assemblies.

18. The method of claim 14, further comprising:
disconnecting said bracket assemblies from the vehicle.

19. The method of claim 18, further comprising:
collapsing said bracket assemblies.

20. The method of claim 18, wherein the vehicle includes a storage compartment, and further comprising:
placing said bracket assemblies in said storage compartment for storing said bracket assemblies.

* * * * *